US008938703B1

(12) United States Patent
Saurabh et al.

(10) Patent No.: US 8,938,703 B1
(45) Date of Patent: Jan. 20, 2015

(54) METHOD AND APPARATUS FOR COMPREHENSION OF COMMON PATH PESSIMISM DURING TIMING MODEL EXTRACTION

(71) Applicant: Cadence Design Systems, Inc., San Jose, CA (US)

(72) Inventors: Sneh Saurabh, Ghaziabad (IN); Naresh Kumar, Greater Noida (IN); Igor Keller, Pleasanton, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/338,272

(22) Filed: Jul. 22, 2014

(51) Int. Cl.
*G06F 9/455* (2006.01)
*G06F 17/50* (2006.01)

(52) U.S. Cl.
CPC ........ *G06F 17/5081* (2013.01); *G06F 17/5009* (2013.01)
USPC ......................................... 716/113

(58) Field of Classification Search
USPC ......................................... 716/113
See application file for complete search history.

(56) References Cited

U.S. PATENT DOCUMENTS

2009/0210841 A1 * 8/2009 Prakash et al. .................... 716/6

OTHER PUBLICATIONS

Moon, Chow., et al., "Timing Model Extraction of Hierarchical Blocks by Graph Reduction," Proc. of Design Automation Conference, Jun. 2002, pp. 152-157.
Goyal, Ratnakar, et al., "Variation Aware Extracted Timing Model," Midwest Symposium on Circuits and Systems, IEEE, Aug. 2007, pp. 5-8.
Zejda, Jindrich, et al., "General Framework for Removal of Clock Network Pessimism," IEEE/ACM International Conference on Computer Aided Design, Nov. 2002, pp. 632-639.

* cited by examiner

*Primary Examiner* — Suresh Memula
(74) *Attorney, Agent, or Firm* — Kenyon & Kenyon LLP

(57) ABSTRACT

Systems and methods for generating Extracted Timing Models (ETM) for use in an analysis of the timing of an integrated circuit design in which common paths that contribute to Common Path Pessimism (CPP) are identified and included in the generated ETM such that a CPP removal algorithm implemented during the timing analysis will be properly adjusted to remove such pessimism. To generate an ETM, the clock latency paths will be characterized, taking into account the pins and timing arcs that are necessary for the identification and removal of common path pessimism, the timing information of the topologically crucial points of the design block will be retained in the ETM, and the non-essential and noisy information will be removed from the ETM to ensure that the ETM is robust and compact.

18 Claims, 9 Drawing Sheets

800

900

1010

METHOD AND APPARATUS FOR COMPREHENSION OF COMMON PATH PESSIMISM DURING TIMING MODEL EXTRACTION

BACKGROUND

Aspects of the present invention relate generally to the field of circuit design and test, and more specifically to static timing analysis and simulation of electronics.

Integrated circuit (IC) design is increasingly complex, sometimes involving millions of elements, shapes or geometries, and may be facilitated with an electronic design automation (EDA) tool that allows a designer to interactively position ("place") and connect ("route") various shapes on the circuit. The EDA tool then creates a circuit layout containing the physical locations and dimensions of the circuit's components, interconnections, and various layers from the original design that may then be fabricated, creating the IC. The designed IC is eventually fabricated by transferring or printing the circuit layout to a semiconductor substrate in a series of layers that collectively will form the features that constitute the devices that make up the components of the integrated circuit.

After or during the design and creation of an IC layout, validation, optimization, and verification operations are performed on the IC layout using a set of testing, simulation, analysis and validation tools. These operations are conventionally performed in part to detect and correct placement, connectivity, and timing errors. For example, as part of the verification, the IC layout may undergo circuit simulation and analysis where the signals between components are tested, for example using static timing analysis (STA) or gate level simulation (GLS).

STA is a method used to assess the timing of a digital circuit using software techniques and certain models that provide relevant characteristics of the circuit design. During STA, models of the expected timing of a digital circuit are created by estimating the expected delay within the circuit, for example, via the anticipated worst case signal path, without requiring a lengthy and cost prohibitive full simulation of the circuit. In conventional STA tools, the setup/hold timing slacks are computed based on conservative combinations of late and/or early launch and early and/or late capture arrival times. The conventional tools use both early and late arrival times on timing arcs that are common to both launching and capturing paths. Since having both early and late arrival times is impossible in a real circuit, the slack obtained is pessimistic and is referred to as Common Path Pessimism. In order to remove this pessimism, typical STA tools are equipped with a Common Path Pessimism Removal (CPPR) algorithm. These tools compute the pessimism arising due to the conservative estimates of the arcs in the common path and the computed pessimism is added to the computed slack to remove the pessimism effect.

During timing analysis of a design block, an Extracted Timing Model (ETM) may be used as an abstract representation of the timing of the interface paths of the block in order to isolate the information of the design block that may have an impact on other timing paths. Therefore, an ETM does not capture the timing of the paths between two flip-flops within the block, since these paths are fully contained inside the given block. When an ETM is extracted, the timing of the interface paths should be the same as if the design block was instantiated instead of the ETM when the ETM is plugged in to the circuit design. ETMs are important in the digital implementation and the sign-off flow, since the compact representation of the timing of the design block in the ETM saves runtime and memory requirements during analysis. It also helps in IP reuse, concurrent design development of different design blocks, and hiding the details of the design block in confidential or proprietary designs.

However, during extraction and modeling of the ETM of a design block, the common path pessimism is conventionally ignored such that additional and unnecessary pessimism is added into the model whenever there is a common timing path. Therefore, there exists a need in the art to develop a method for generating an ETM for a design block such that the pessimism arising due to the common path in the clock-network can be removed.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

A technique to accurately model the common paths in the clock-network of a design block within a circuit design, and extract the relevant information of these paths into an Extracted Timing Model (ETM) of the design block is described. This technique captures and models all the relevant timing and topological information of the clock-tree of the design block that is necessary to remove the common path pessimism when the ETM is plugged in to the circuit design. When the ETM of the design block that has been generated as described herein is plugged in to the circuit design, pessimism arising due to common paths in the clock network can be removed by an STA tool equipped with a Common Path Pessimism Removal (CPPR) Algorithm.

According to an embodiment, to generate an ETM, the clock latency paths will be characterized, taking into account the pins that are important for the removal of common path pessimism, the timing information of the topologically crucial points of the design block will be retained in the ETM, and the non-essential and noisy information will be removed from the ETM to ensure that the ETM is robust and compact.

Figure 2:
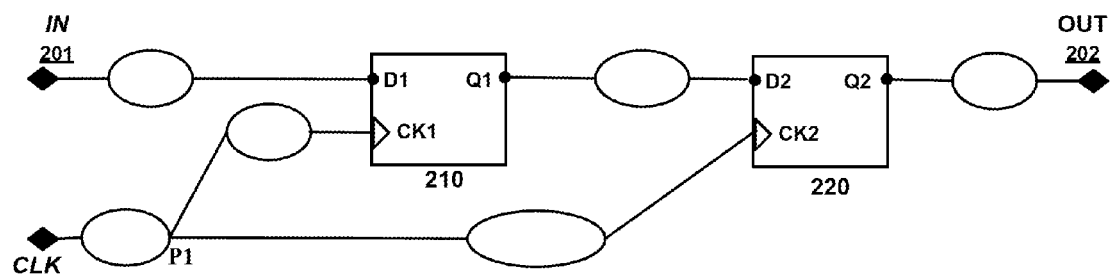
FIG. 2 illustrates exemplary data paths, launch clock paths, and capture clock paths according to an embodiment of the present invention.

Preliminarily it may be noted that for the purposes of this disclosure, a timing path may be represented as a sequence of pins. An exemplary timing path consisting of n pins is illustrated in FIG. 2. The exemplary timing path can be represented as: $P_{1\_n} = \{p_1, p_2, \ldots, p_n\}$ The pin $p_1$ is the input pin and the pin $p_n$ is the output pin of the path. A timing path between two pins $p_i$ and $p_j$ is also known as a timing arc and may be is denoted as $\text{Arc}_{pi\_pj}$.

An arc may be further defined by the following several attributes:

the source of an arc is represented by the source pin of the arc (source=$p_i$);

the sink of an arc is represented by the sink pin of the arc (sink=$p_j$);

the source and sink pins each have a transition, ($\text{trans}_{pi}$ and $\text{trans}_{pj}$ respectively) which represent the transition, either rise or fall, at the respective pins;

the set of slews at the source pin $p_i$ is represented by inslew;

the $k^{th}$ slew in the timing arc is represented as inslew($\text{Arc}_{pi\_pj}$)[k];

the set of loads at the sink pin $p_j$ is represented by load;

the $k^{th}$ load in the arc is represented as load($\text{Arc}_{pi\_pj}$)[k];

the $\text{outslew}_{ARCpi\_pj}$ represents the set of output slews at the pin $p_j$ corresponding to each combination of input slew at $p_i$ and the load at pin $p_j$;

the output slew corresponding to the $k^{th}$ input slew and the $l^{th}$ load is represented as outslew($\text{Arc}_{pi\_pj}$)[k][l] (therefore if the number of elements in inslew($\text{Arc}_{pi\_pj}$) is N and the number of elements in load($\text{Arc}_{pi\_pj}$) is M, then the number of elements in outslew(Arcpi→pj) is N×M);

the delay ($\text{delay}_{Arcpi\_pj}$) represents the set of delays from the pin $p_i$ to the pin $p_j$ corresponding to each combination of slew at $p_i$ and load at $p_j$; and the delay corresponding to the $k^{th}$ input slew and $l^{th}$ load is represented as delay($\text{Arc}_{pi\_pj}$)[k][l] (therefore if the number of elements in inslew($\text{Arc}_{pi\_pj}$) is N and the number of elements in load($\text{Arc}_{pi\_pj}$) is M, then the number of elements in delay($\text{Arc}_{pi\_pj}$) is N×M).

An arc, along with its attributes, may be represented as: $\text{Arc}_{pi\_pj} = (p_i, p_j, \text{trans}_{pi}, \text{trans}_{pj}, \text{inslew}, \text{load}, \text{outslew}_{Arci\_j}, \text{delay}_{Arci\_j})$.

Figure 1:
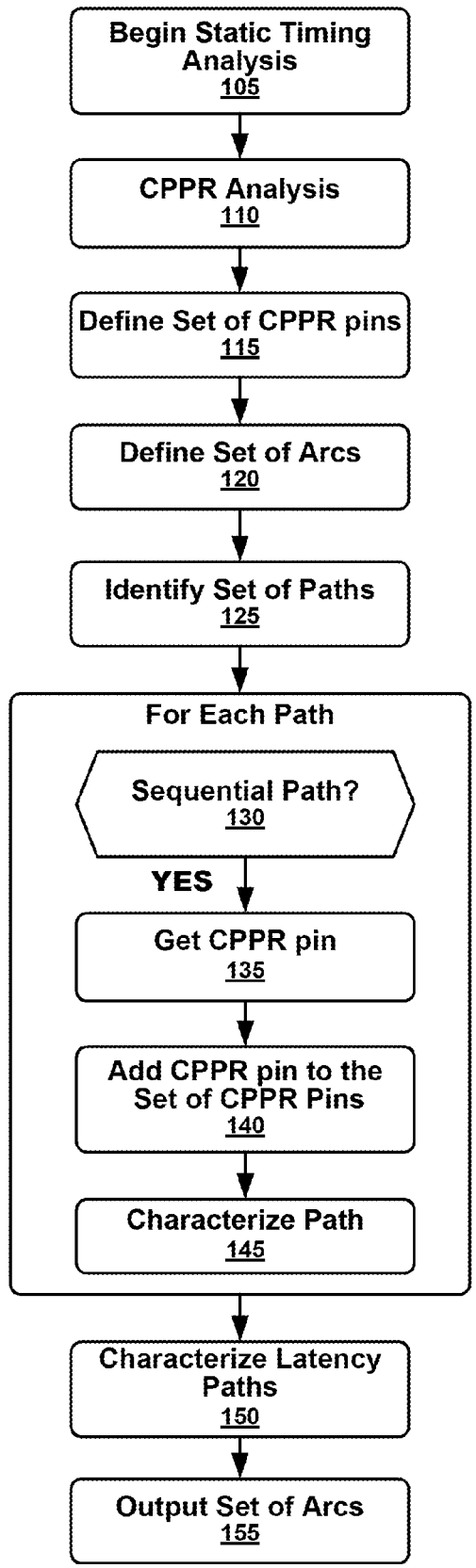
FIG. 1 illustrates an exemplary method for creating an ETM according to an embodiment of the present invention.

FIG. 1 illustrates an elemplary method for creating an ETM according to an embodiment of the present invention. As shown in FIG. 1, preliminarily, a static timing analysis is executed on a design (block 105). Then, a CPPR analysis is performed for the design (block 110).

Primarily, a CPPR analysis will identify the CPPR pin as a pin that is common in the launch clock path and the capture clock path. Exemplary data paths, launch clock paths, and capture clock paths are illustrated in FIG. 2. A design block may have one or more data paths. For example, as shown in FIG. 2, the path from the clock pin of the launching flip-flop 210 to the data pin of the capturing flip-flop 220, e.g. the path from CK1 to D2, is a data path.

An interface path of a block within a design is a path that passes through some input port or output port of the block. These paths may be captured or launched by some other block or top-level design. Interface paths include input port to flip flop paths, flip flop to output port paths, and input port to output port paths. For the interfaces of the design block in FIG. 2, the interface paths include the path from an input port 201 to the data pin D1 of the flip-flop 210, and the path from the clock-port CLK, passing through the clock-pin CK2 of the flop-flop 220 to the output port 202.

Clock paths are defined as the paths that start at the pins that act as clock-sources. The clock sources may be defined by the user on certain pins of the design, along with other clock attributes like clock-period and duty-cycle. A clock path may be a launch clock path, defined as the path from the clock-source CLK to the clock pin CK1 of a flip flop that launches the data signal 210, or a capture clock path, defined as the path from a clock source CLK to the clock pin CK2 of the flip flop that captures the data signal 220.

For the design block illustrated in FIG. 2, a CPPR pin, e.g. a pin that is common in the launch clock path and the capture clock path, will be identified at pin $p_1$. The pins that are identified as a CPPR pins depend on the path that is being analyzed and, therefore, there can be a large number of CPPR pins in a design. After determining a CPPR pin, the pessimism arising for the path will be computed by finding the minimum and the maximum arrival times at that pin. Therefore the CPPR analysis will identify a CPPR pin in each path.

Returning to FIG. 1, once CPPR analysis is complete, the CPPR pins in the design block are identified. A set of CPPR pins that are relevant for interface paths in the design (block 115) and a set of arcs to be included in the ETM (block 120), are created and are initially an empty set.

Then a set of paths that are relevant for the ETM is created (block 125). For each path in the design block, if the path is sequential (block 130), a CPPR pin of the path is retrieved (block 135) and added to the set of CPPR pins (block 140). For some sequential paths there may not be any pessimism, in which case no pin is retrieved. Then the path will be characterized (block 145). Once all the sequential paths are characterized, the latency paths may be characterized (block 150). For each latency path, the path will be characterized without retrieving the CPPR pin. For the paths that are characterized, the arc corresponding to the path will be added to the set of arcs during characterization. Characterization is described in further detail with reference to FIG. 3.

Characterization will identify those paths that are to be included in the ETM to minimize common path pessimism. The set of arcs that will be part of the ETM are then output for ETM generation (block 155).

Figure 3:
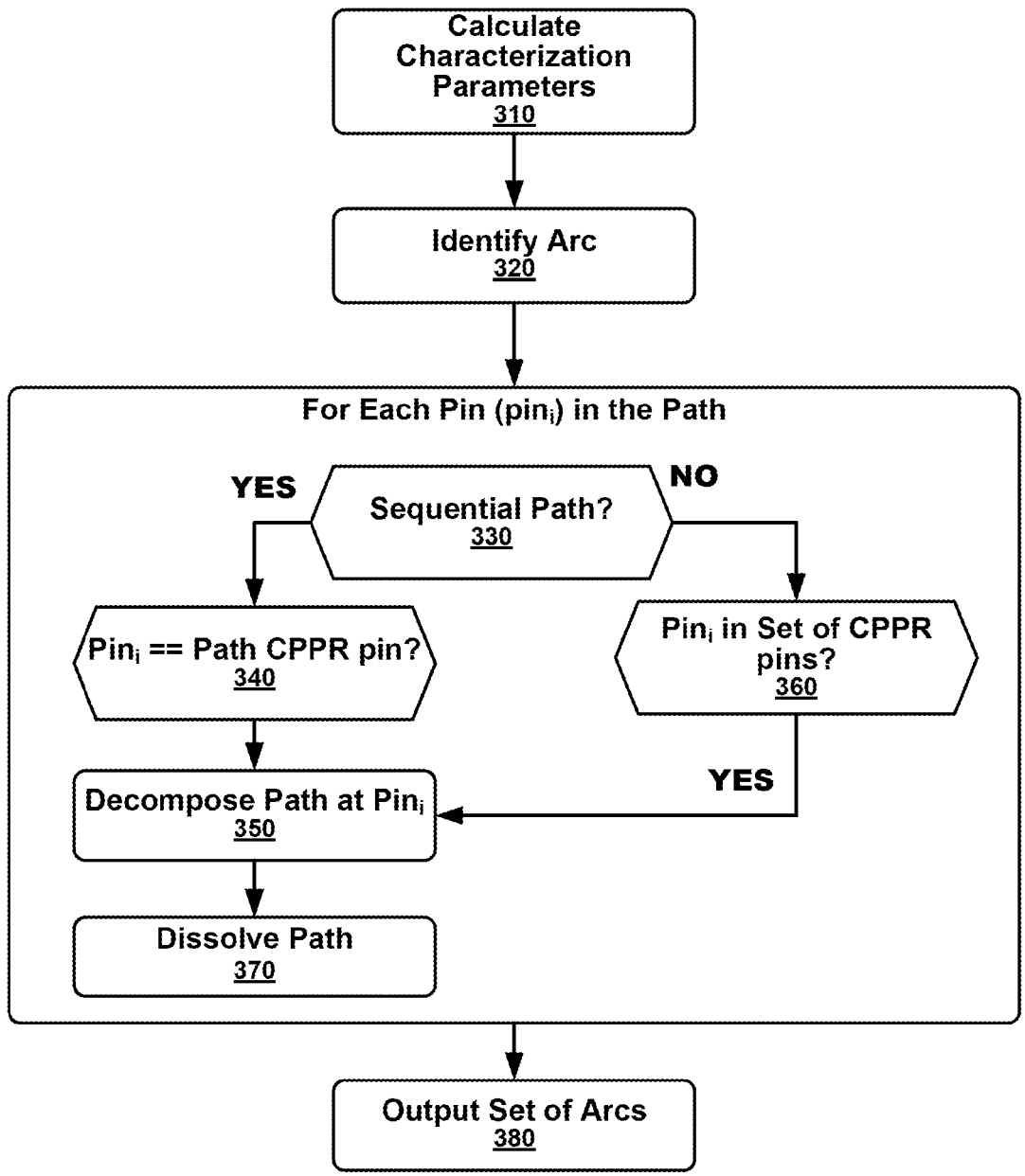
FIG. 3 illustrates a simplified method for characterizing paths for an ETM according to an embodiment of the present invention.

FIG. 3 illustrates a simplified method for characterizing paths for an ETM according to an embodiment of the present invention. As shown in FIG. 3, preliminarily, the characterization parameters $\text{slew}_{CHAR}$ and $\text{load}_{CHAR}$ are calculated for the path being characterized (block 310). $\text{slew}_{CHAR}$ is the set of slews for which the path is to be characterized, determined by the characteristics of the instances in the interface path and user defined parameters for the path. $\text{load}_{CHAR}$ is the set of loads at the output port of the ETM, determined by the characteristics of the instances driving the output port, as well as user defined parameters of the path. According to an aspect of an embodiment, when a pin is referenced during characterization, the attributes of the path have already been computed and stored with the arc during an earlier stage of the analysis. Then the first arc in the path is identified (block 320). For each pin in the path, if the path type is sequential (block 330), and if the pin is a CPPR pin for the path (block 340), the path will be decomposed at the pin (block 350). If the path type is not sequential (e.g. if the path is a latency path) (block 330), and if the pin is already in the CPPR set of pins (block 360), the path will be decomposed at the CPPR pin (block 350). Therefore both sequential paths and latency paths will be decomposed at the CPPR pins.

Decomposition is used to retain the timing information of the topologically crucial points of the design block in the ETM. Upon decomposition of an arc into a first arc and a second arc, the first arc is added to the stored set of ETM arcs and a new arc is created for potential decomposition.

Figure 4:
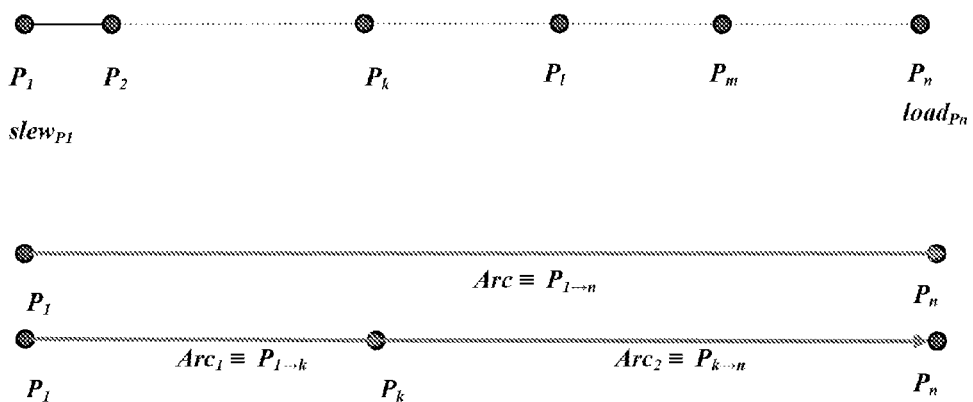
FIG. 4 illustrates an exemplary set of arcs before and after decomposition according to an embodiment of the present invention.

FIG. 4 illustrates an exemplary set of arcs before and after decomposition according to an embodiment of the present invention. Preliminarily, a timing path $P_{1\_n}$ is provided. The input slew at pin $p_1$ is designated as $slew_{p1}$ and the load at the pin $p_n$ is designated as $load_{pn}$. This path is represented as a single arc. The delay of the arc is the total delay of the path $P_{1\_n}$ and the output-slew of the arc will be the slew at the output pin $p_n$, for the given slew $slew_{p1}$ and load $load_{pn}$. The decomposition performed at a given pin $p_k$ on the timing path $P_{1\_n}$, decomposes the arc into two arcs: the first arc representing the characteristics of the path $P_{1\_k}$, and the second arc representing the characteristics of the path $P_{k\_n}$ such that:

$$P_{1\_k}=\{p_1, p_2, \ldots, p_k\} \text{ and } P_{k\_n}=\{p_k, \ldots, p_l, \ldots, p_m, \ldots, p_n\}$$

The delay $delay_{Arc1}$ of the first arc $Arc_1$ is the total delay of the path $P_{1\_k}$, for the given slew $slew_{p1}$ and the load at the pin $p_k$ $load_{pk}$. It may be noted that since $p_k$ is an internal pin of the given block, $load_{pk}$ is a known fixed design attribute. The output slew $out\_slew_{Arc1}$ of the first arc $Arc_1$ is the output-slew at pin $p_k$ for the given input slew $slew_{p1}$ and the load $load_{pk}$.

The input slew of the second arc $Arc_2$ is the output slew of the first arc $Arc_1$ and the input transition of the second arc $Arc_2$ is the output-transition of the first arc Arc1. The delay of the arc $Arc_2$ is the total delay of the path $P_{k\_n}$, for the computed slew $out\_slew_{Arc1}$ and the load $load_{pn}$. The output slew $out\_slew_{Arc2}$ of the arc $Arc_2$ is the output-slew at pin $p_n$ for the computed slew $out\_slew_{Arc1}$ and the load $load_{pn}$. The output slew $out\_slew_{Arc2}$ of the arc $Arc_2$ will also be the same as the output slew of the original arc Arc. Therefore, as a result of the decomposition, the delay information (D) of the complete path $P_{1\_n}$ is decomposed as follows:

$$D_{p1 \to pn} = D_{p1 \to pk} + D_{pk \to pn}$$

According to an embodiment, the decomposition can be performed for any pin of the path or recursively on the sub-paths. At most, a path may be decomposed at all the internal pins of the path $\{p_2, \ldots, p_k, \ldots, p_l, \ldots, p_{n-1}\}$.

Therefore, the result of the decomposition at pin $p_k$ is that the arc $Arc_{p1\_pk}$ is added to the set of ETM arcs and a new arc $Arc_{pk\_pn}$ is created. Then arc $Arc_{pk\_pn}$ is used to compute the attributes of the path $P_{k\_n}$. Thus, in effect, the ETM arc $Arc_{p1\_pn}$ is decomposed into two ETM arcs $Arc_{p1\_pk}$ and $Arc_{pk\_pn}$. New arc $Arc_{pk\_pn}$ will then be characterized to determine if further decomposition is required.

Returning to FIG. 3, after a path is decomposed into multiple new paths, the new paths are dissolved (block 370). Dissolving the paths allows for the removal of non-essential and noisy information from the ETM to make the ETM more robust and compact.

In the generated ETM, for a timing arc, the delay and the output slew is written as a function of input slew and the output load. Assuming that there are N input-slews and M output-loads, the delay and the output-slews contain N×M entries and is a two-dimensional (2-D) table.

When the path is decomposed into sub-paths, the structure of the delay and the output slews table would change. For example, the path $P_{1\_n}$ may be decomposed at T internal pins $\{p_{k1}, p_{k2}, \ldots, p_{kT}\}$ as follows: $P_{1\_n}=\{P_{1\_k1}, P_{k1\_k2}, P_{k2\_k3}, \ldots, P_{T-1\_T}, P_{T\_n}\}$. Since the load at $p_{k1}$ is known and fixed, the delay and the output slew table corresponding to the path $P_{1\_k1}$ would contain N entries and is a one-dimensional (1-D) table. Each entry in the delay and the output slew table corresponds to the N input slews. Similarly, the delay and the output slew for all the paths will consist of N entries. Therefore the delay and the output slew table for all the paths will contain N entries. At the pin $p_n$ there is a set of loads M for which the characterization is computed. Therefore, the delay and the output slews for the path $P_{kT\_n}$ contain N×M entries and is a 2-D table.

Thus when a given path is decomposed at T internal pins, the original timing information contained in a 2-D table is decomposed into T 1-D tables and one 2-D table. In order to compute the delay of the path $P_{1\_n}$ using the ETM, the delay calculator has to compute the delay of all the intermediate arcs using these T 1-D tables and one 2-D table. For the arcs modeled at certain discrete input slews/output loads, the delay calculator may have to perform a number of interpolations and/or extrapolations. As a result, when a path is decomposed multiple times, the resultant decomposed delay/slew tables become susceptible to numerical errors.

For example, if the slew gets stabilized around a value at some pin $p_{k1}$ and the arc is decomposed at $p_{k1}$ without being dissolved, the characterization of the subsequent arcs in the path will be done within a very narrow slew interval. As a result, an appreciable numerical error may be encountered in the delay calculation due to extrapolation because the numerical noise can make the input slew go beyond the characterized narrow slew interval.

However, when a pin $p_{k1}$ lies a few stages further away in the fan-out of the input pin $p_1$, the effect of the change of the input slew at input pin $p_1$ has little effect on the output slew at the pin $p_{k1}$. As a result, if the path is decomposed a few stages away from the input pin $p_1$, the output slew practically attains a constant value. When this is the case, the set of slews at $p_{k1}$ can be replaced by an average slew at that pin. Therefore, the delay and the output slew of the subsequent timing arcs can be modeled as a scalar value, since the input slew and the load are a fixed and known quantity for the subsequent arcs. When the delay and the output slew are modeled as a scalar value rather than the 1-D table, the delay calculation does not involve any interpolation or extrapolation, making the model more robust. The process of dissolving a 1-D arc into a scalar value is referred to herein as dissolving.

It may be noted that, assuming that the slews get stabilized at the first decomposition pin $p_{k1}$, the original timing information contained in a 2-D table is decomposed into (T−1) scalar values and two 1-D tables. The 1-D tables are for the first arc (since the delay/output-slews are characterized for given N input-slews and a fixed load at $p_{k1}$) and the last arc (since the delay/output-slews are characterized for M output-loads and fixed stabilized slew). Therefore, dissolving the arcs leads to a compact representation of the arcs in ETM.

If the slew at the CPPR pin is stabilized, then the set of input slews get dissolved to a scalar slew. When the ETM arc starts on a pin where the input slews have been stabilized and ends on a pin that is decomposed further, then the ETM arc is modeled as a scalar value instead of a 1-D or 2-D table. When the ETM arc starts on a pin where the input slews have been stabilized and ends on an output port, then the ETM-arc is modeled as a 1-D table.

Figure 5:
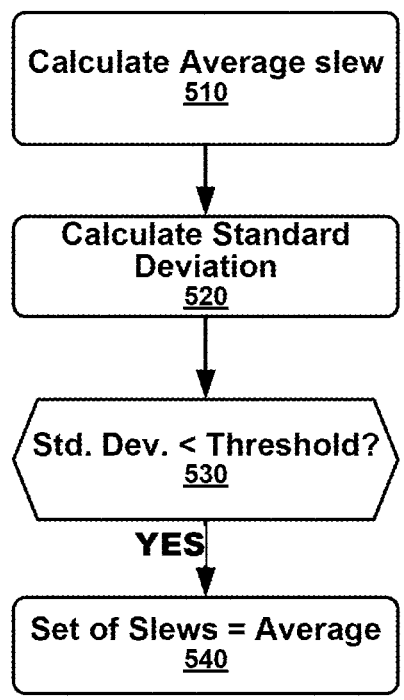
FIG. 5 illustrates a simplified exemplary method for dissolving an arc according to an embodiment of the present invention.

FIG. 5 illustrates a simplified exemplary method for dissolving an arc according to an embodiment of the present invention. As shown in FIG. 5, to dissolve an arc, given a set of input slews, an average slew of the given slews is first calculated (block 510). Then the standard deviation for the given set of slews is calculated (block 520). If the standard deviation is less than a predetermined value (e.g. 0.5%) (block 530), the given set of slews may be considered stabilized and consistent at the calculated average value and the set of slews is replaced by the average slew (block 540). If the standard deviation is greater than the predetermined threshold, no change will be made to the slews of the arc.

Returning again to FIG. 3, through the iteration over each pin, any successive arcs not decomposed and dissolved are merged to form a single arc. This merged arc will then be added to the set of arcs that are output and used in the ETM (block 380).

Figure 6:
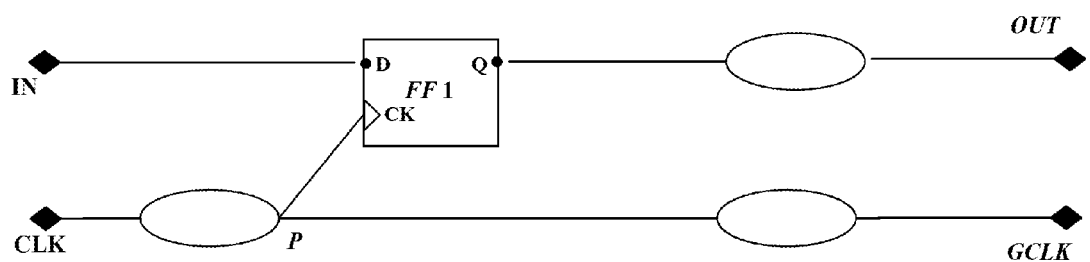
FIG. 6 is a simplified block diagram illustrating a simple circuit.

FIG. 6 is a simplified block diagram illustrating a simple circuit. As shown in FIG. 6, there is a clock asserted on the port CLK. There is a generated clock asserted on the port GCLK and the master-clock of GCLK is CLK. There is a sequential path from the CLK to the output port OUT. The output port OUT is constrained with respect to the generated clock GCLK (since this is captured by GCLK). In this circuit, there is a common path between the launch clock path and the capture clock path from CLK to the pin P.

According to an embodiment, the common paths in a clock network are modeled in an ETM such that the topology of the clock network in a design block is preserved. The clock-network in the ETM is modeled as a tree. The root node of the clock-network tree in the ETM corresponds to the port/pin in the block where the root clock, a clock that is not derived from any other clock, is asserted. The nodes of the clock-network may include a clock node corresponding to the port/pin of the design block on which the clock attribute is asserted, and a CPPR node corresponding to the CPPR pin of an interface path in the design block. A CPPR node is retained in the clock network of the ETM to model the common path between the launch clock path and the capture clock path. The successor/predecessor relationships between the nodes in the clock-network in the ETM is the same as the successor/predecessor relationships between the corresponding ports/pins in the design block. Therefore, the topology of the nodes in clock-network in the ETM mimics the topology of pins in the clock-network in the design block.

Additionally, the clock-network in the ETM may contain one or more arcs of various types including an arc from a clock node to another clock node, an arc from a CPPR node to a clock node, or an arc from a CPPR node to another CPPR node. These timing arcs in the ETM represent the paths between the corresponding pins in the given block. The attributes of the timing arc between these nodes in the ETM accurately models the timing relationship between the corresponding pins in the given block.

Figure 7:
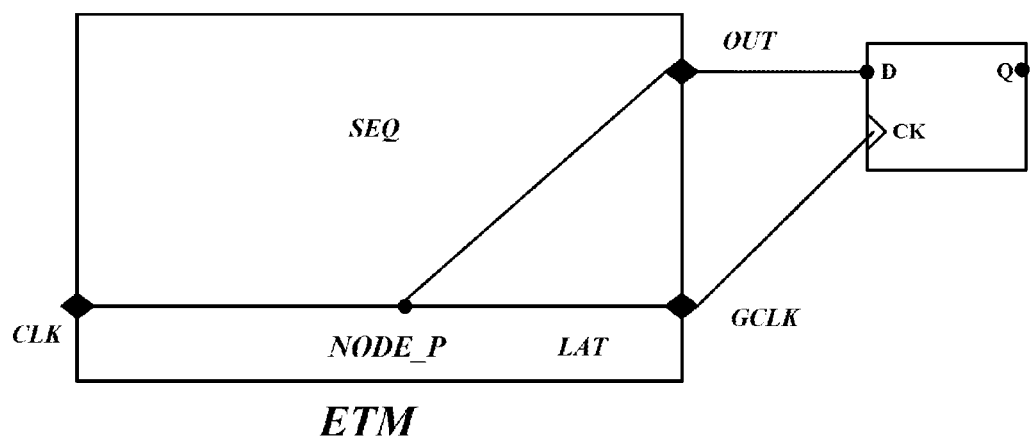
FIG. 7 illustrates an exemplary ETM generated for a simple circuit according to an embodiment of the present invention.

FIG. 7 illustrates an exemplary ETM generated for a simple circuit according to an embodiment of the present invention. Specifically, FIG. 7 illustrates the ETM generated for the circuit in FIG. 6 according to an embodiment of the present invention. As shown in FIG. 7, a pin is retained in the ETM at NODE_P to model the common path in the launch clock path and the capture clock path.

It may be noted that the circuit illustrated in FIG. 6 is a very simple case of CPPR nodes. In general, there can be several CPPR nodes and clock nodes, structured in a form of a tree, in the modeled ETM.

Figure 8:
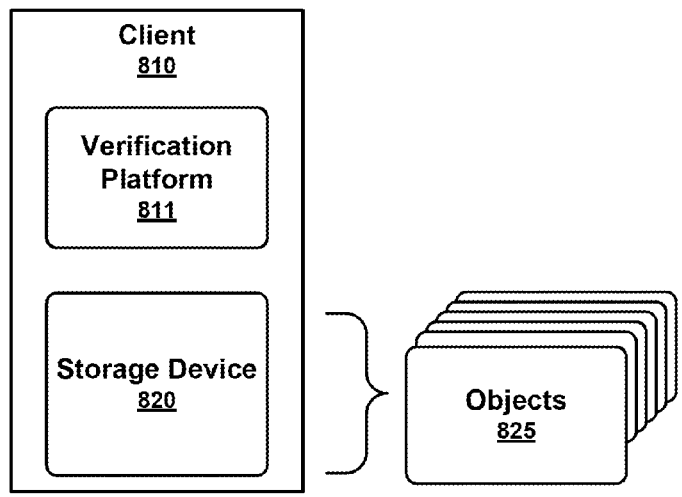
FIG. 8 is a simple block diagram illustrating components of an exemplary system according to an embodiment.

A user or designer may access an analysis tool to model and analyze a design block with an ETM in a standalone client system, client-server environment, or a networked environment. FIG. 8 is a simple block diagram illustrating components of an exemplary system 800 according to an embodiment. As shown in FIG. 8, a system 800 may comprise a client 810 executing an analysis tool 811 and having a memory storage 820. The client 810 may be any computing system that executes an analysis tool 811 or otherwise facilitates access to memory storage 820, for example a personal computer. The client 810 may include a processor that performs a method in accordance with the disclosed embodiments. Such a client would be part of an overall test system in accordance with the disclosed embodiments.

Hardware models, instruction sets, software packages, timing files, netlists and other objects 825 used by the analysis tool 811 may be stored in memory storage 820. A user may access the objects 825 stored in memory storage 820 with the client 810 via the analysis tool 811, where the analysis tool 811 is capable of accessing memory storage 820 and displaying the objects 825 and the data associated with the timing analysis. The analysis tool 811 may include a user interface, for example a program, application or middleware that acts as a frontend to and facilitates access to objects in memory storage 820. The analysis tool 811 may facilitate executing STA and developing an ETM using the tools and procedures described herein. The user may interact with the analysis tool 811 through a number of input devices, such as by inputting a selection as with a mouse or inputting a request as with a keyboard. The user may observe the analysis results on an output device or display. The analysis tool 811 may run in an application window controlled by the user.

As shown in FIG. 8, a client 810 may be a stand-alone system, as may be of particular interest where the components being analyzed and tested are highly confidential. Additionally, according to an aspect of an embodiment as shown in FIG. 4, a client 410 may be part of a networked environment.

Figure 9:
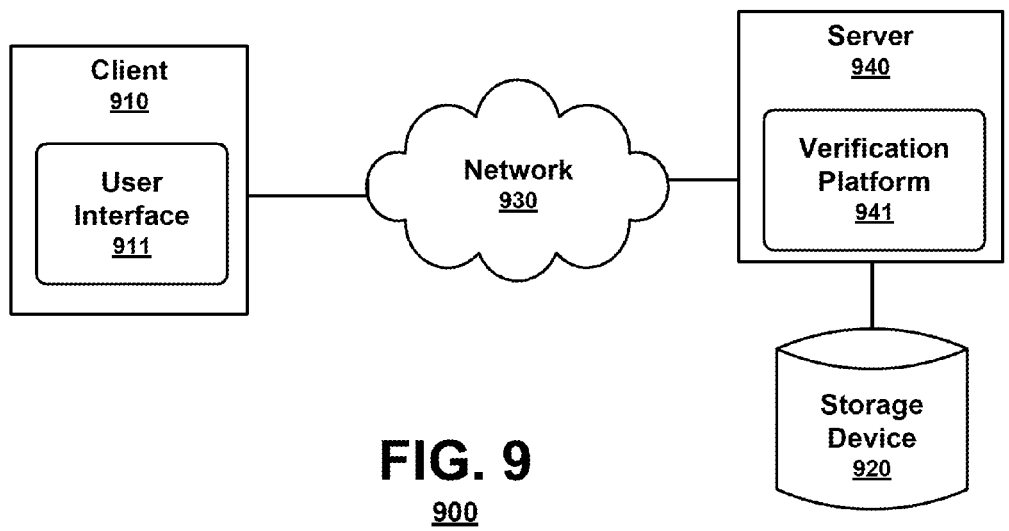
FIG. 9 is a simple block diagram illustrating components of an exemplary system according to an embodiment.

FIG. 9 is a simple block diagram illustrating components of an exemplary system 900 according to an embodiment. As shown in FIG. 9, system 900 may include a client 910 having a user interface 911. The client 910 may be connected to a server 940 via a network 930. The analysis tool 941, which in this embodiment is located at server 940, may have access to storage device 920 storing hardware models, instruction sets, software packages, timing files, netlists and other objects utilized by the analysis tool 941. The server 940 may include a processor that performs a method in accordance with the disclosed embodiments. Such a server then would be part of an overall test system in accordance with the disclosed embodiments.

A user may access an analysis tool 941 at the server 940 via the client 910 having a user interface 911 capable of accessing and displaying the design and the results of the STA and ETM generation. The client 910 may be any computing system that facilitates the user accessing storage device 920, for example a personal computer. The network 930 may be a wired or wireless network that may include a local area network (LAN), a wireless network, the Internet, or any other network available for accessing storage device 920 from the client 910.

The server 940 may be a network server accessible to the client 910 via the network 930 that may manage access to storage device 920. The user interface 911 may receive instructions regarding testing a design from the user and utilizing the objects stored in memory storage 920, facilitate a display of the analysis or the information gathered during the analysis. Multiple different clients (not shown) may access storage device 920 via the network 930 and request access to the objects stored therein.

In another networked environment, the analysis tool may be executed on a network capable client and access the models, packages and other objects stored in one or more storage devices via a network and communications server.

Figure 10:
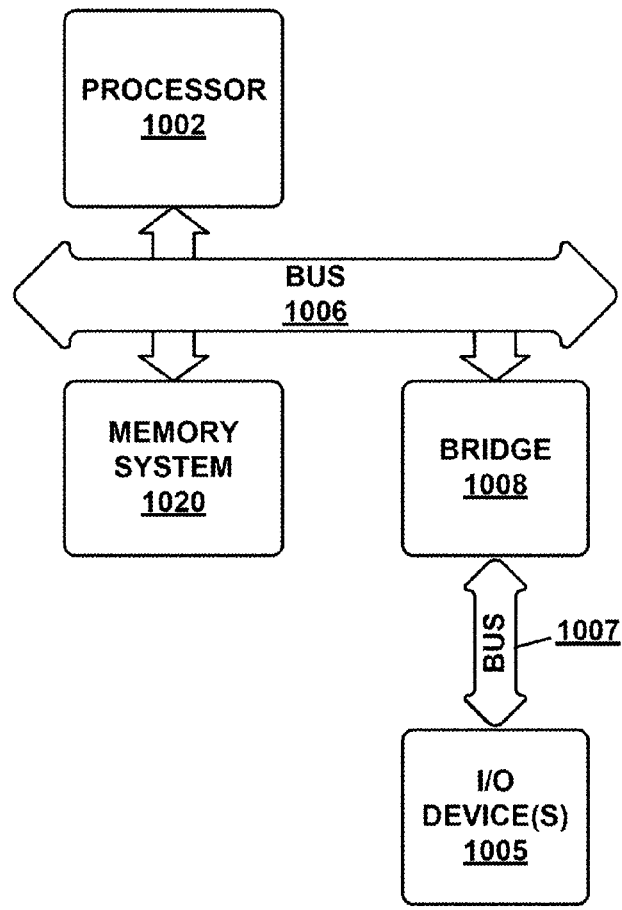
FIG. 10 is a simple block diagram illustrating components of an exemplary client according to an embodiment of the present invention.

FIG. 10 is a simple block diagram illustrating components of an exemplary client 1010 according to an embodiment of the present invention. As shown in FIG. 10, the client 1010 configured to execute the analysis tool as described herein may include a processor 1002, a memory system 1020 and one or more input/output (I/O) devices 1005 in communication. The communication can be implemented in a variety of ways and may include one or more computer buses 1006, 1007 and/or bridge devices 1008 as shown in FIG. 10. The I/O devices 1005 can include network adapters and/or mass storage devices from which the client 1010 can receive commands for executing the simulation.

As shown in FIG. 8, a client 1010 may be a stand-alone system, as may be of particular interest where the components being simulated are highly confidential. Additionally, according to an aspect of an embodiment as shown in FIG. 9, a client 1010 may be part of a networked environment.

Although ETM generation is primarily described with reference to path enumeration, e.g. where interface paths that are relevant for the ETM are first enumerated and important characteristics of these enumerated paths are extracted, the described ETM generation can also be applied to a graph reduction method of ETM generation, e.g. where a timing graph is reduced by successively removing the nodes of the graph that are not relevant for the ETM by merging timing arcs and retaining important characteristics of the interface paths.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, when executed by a processor, cause the processor to perform a method in accordance with the embodiments. Other applications of the present invention may be embodied as a hybrid system of dedicated hardware and software components. Moreover, not all of the modules described herein need be provided or need be provided as separate units. Additionally, it is noted that the arrangement of the blocks in FIGS. 1, 3, and 5 do not necessarily imply a particular order or sequence of events, nor are they intended to exclude other possibilities. For example, the operations depicted at blocks 315 and 320 may occur in an alternate order or substantially simultaneously with each other. Such implementation details are immaterial to the operation of the present invention unless otherwise noted above.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method for generation of an Extracted Timing Model (ETM) of a design block in an integrated circuit design, the method comprising:

on a computer device having a processor configured to implement an analysis tool to test the timing of the design, for each common timing path in the design block:
identifying a pin in the common timing path between a launch clock path and a capture clock path of the design block;
decomposing the timing path into two arcs at the identified pin;
removing non-essential information from the two arcs; and
adding the two arcs and the identified pin to the generated ETM for the design block.

2. The method of claim 1, wherein removing non-essential information from the arcs further comprises:
calculating an average slew for a set of input slews of each of the arcs;
calculating the standard deviation of the set of slews; and
if the standard deviation is less than a predetermined threshold, setting the set of input slews to a single scalar value equal to the calculated average slew.

3. The method of claim 1, wherein the two arcs are further decomposed at each pin in the common timing path into a plurality of new arcs.

4. The method of claim 1, wherein said decomposing further comprises calculating the timing information of the two arcs.

5. The method of claim 1, wherein the ETM models a clock network of the design block as a tree.

6. The method of claim 5, wherein each identified pin is included as a node in the tree.

7. A non-transitory computer readable medium storing instructions that when executed by a processor perform a method for generating an Extracted Timing Model (ETM) of a design block in an integrated circuit design, the method comprising:

for each common timing path in the design block:
identifying a pin in the common timing path between a launch clock path and a capture clock path of the design block;
decomposing the timing path into two arcs at the identified pin;
removing non-essential information from the two arcs; and
adding the two arcs and the identified pin to the generated ETM for the design block.

8. The non-transitory computer readable medium of claim 7, wherein removing non-essential information from the arcs further comprises:
calculating an average slew for a set of input slews of each of the arcs;
calculating the standard deviation of the set of slews; and
if the standard deviation is less than a predetermined threshold, setting the set of input slews to a single scalar value equal to the calculated average slew.

9. The non-transitory computer readable medium of claim 7, wherein the two arcs are further decomposed at each pin in the common timing path into a plurality of new arcs.

10. The non-transitory computer readable medium of claim 7, wherein said decomposing further comprises calculating the timing information of the two arcs.

11. The non-transitory computer readable medium of claim 7, wherein the generated ETM models a clock network of the design block as a tree.

12. The non-transitory computer readable medium of claim 11, wherein each identified pin is included as a node in the tree.

13. A system comprising:
a memory to store an integrated circuit design; and
a processor configured to generate an Extracted Timing Model (ETM) of a design block in the design by:
  identifying a pin in a common timing path between a launch clock path and a capture clock path of the design block;
  decomposing the timing path into two arcs at the identified pin;
  removing non-essential information from the two arcs; and
  adding the two arcs and the identified pin to the generated ETM for the design block.

14. The system of claim 13, wherein the processor is further configured to remove non-essential information from the two arcs by:
  calculating an average slew for a set of input slews of each of the arcs;
  calculating the standard deviation of the set of slews; and
  if the standard deviation is less than a predetermined threshold, setting the set of input slews to a single scalar value equal to the calculated average slew.

15. The system of claim 13, wherein the processor is further configured to decompose the two arcs at each pin in the common timing path into a plurality of new arcs.

16. The system of claim 13, wherein said decomposing comprises calculating the timing information of the two arcs.

17. The system of claim 13, wherein the generated ETM models a clock network of the design block as a tree.

18. The system of claim 17, wherein each identified pin is included as a node in the tree.

\* \* \* \* \*